(12) United States Patent
Kidakarn

(10) Patent No.: US 9,979,213 B2
(45) Date of Patent: May 22, 2018

(54) ANIMATED BATTERY CHARGING ASSEMBLY

(71) Applicant: Michael Kidakarn, City of Industry, CA (US)

(72) Inventor: Michael Kidakarn, City of Industry, CA (US)

( * ) Notice: Subject to any disclaimer, the term of this patent is extended or adjusted under 35 U.S.C. 154(b) by 63 days.

(21) Appl. No.: 15/240,480

(22) Filed: Aug. 18, 2016

(65) Prior Publication Data

US 2017/0054305 A1 Feb. 23, 2017

Related U.S. Application Data

(60) Provisional application No. 62/207,825, filed on Aug. 20, 2015.

(51) Int. Cl.
*H02J 7/00* (2006.01)
*H04M 1/00* (2006.01)
*H04M 1/04* (2006.01)

(52) U.S. Cl.
CPC .......... *H02J 7/0021* (2013.01); *H02J 7/0044* (2013.01); *H04M 1/00* (2013.01); *H02J 2007/0096* (2013.01); *H04M 1/04* (2013.01)

(58) Field of Classification Search
CPC .................. H02J 7/0021; H02J 7/0044; H02J 2007/0096; H04W 88/02

USPC ......................................................... 320/115
See application file for complete search history.

(56) References Cited

U.S. PATENT DOCUMENTS

| 9,093,849 B2* | 7/2015 | Carreon et al. ......... H04M 1/04 |
| 9,276,423 B2* | 3/2016 | Yang ...................... H02J 7/0044 |
| 2015/0077041 A1* | 3/2015 | Magana et al. ........ H02J 7/0042 320/107 |

* cited by examiner

*Primary Examiner* — Sun Lin
(74) *Attorney, Agent, or Firm* — Elizabeth Yang

(57) ABSTRACT

An animated battery charging assembly provides a charging dock for dual purposes of charging a battery for an electrical device, and providing an entertaining indicator of a power level for the battery during the charging through the use of an animated model that articulates in correlation to the power level of battery. The charging dock charges a battery for an electrical device. The charging dock also supports an attached model that depicts a character, like a fictional or real character capable of animation, audio, and illumination. A fan cools the electrical device during charging, and enhances an animation effect of the animated model. An amount of energy remaining in the battery of the electrical device during charging is depicted as a power level. The model articulates limbs, garment, and accessories in correlation to power level. Software communicates the power level pertinent to the animated model for an appropriate articulation.

20 Claims, 3 Drawing Sheets

US 9,979,213 B2

ANIMATED BATTERY CHARGING ASSEMBLY

CROSS REFERENCE OF RELATED APPLICATIONS

This application claims the benefits of U.S. provisional application No. 62/207,825 filed Aug. 20, 2015 and entitled Animated Charging Assembly, which provisional application is incorporated by reference herein in its entirety.

FIELD OF THE INVENTION

The present invention relates generally to an animated battery charging assembly. More so, an animated charging assembly provides a charging dock for the dual purpose of charging a battery for an electrical device, and providing an entertaining indicator of the power level for the battery through a model that articulates in correlation to the power level of the battery during the duration of the charge; whereby a model operatively connected to the charging dock articulates, illuminates, and emits audio signals in correlation to the power level for the battery of the electrical device; whereby software enables communication between the charging dock, the electrical device, and the model for displaying an image on the electrical device or actuating articulation of the model to indicate the power level; whereby a fan cools the electrical device and enhances animation of the model.

BACKGROUND OF THE INVENTION

It is known that battery operated computerized devices with high resolution display screens, such as Smartphones, are nearly ubiquitous in the modern world. Often, such devices, such as smartphones, utilize comparatively large amounts of power. These devices often have rechargeable batteries, such as lithium-ion batteries, as well as power jacks that allow the device's battery to be recharged by outside power sources. Such power jacks allow the computerized device to be recharged by an AC adapter or USB (Universal Serial Bus) cable to an external power source.

Typically, when these computerized devices are plugged into an external recharging power source, invariably the device will display a recharging screen that may, for example, show a still or moving icon, image, or cartoon of a battery, along with some indication that the battery is recharging. Often, the user may also continue to use the computerized device for other functions while the device is charging.

Known methods of charging rechargeable batteries, such as lead-acid batteries found in automobiles and other electric vehicles, typically are constant voltage source chargers. Since the proper voltage for such a battery depends on a variety of factors including battery age, temperature, and the amount of charge in the battery, known constant voltage chargers tend to overcharge older or lower voltage or hotter batteries and tend to undercharge newer, cooler higher voltage batteries. In addition batteries tend to discharge over time due to an internal current draw or self-discharge leakage between the cells of the battery.

Often, in the charging of most types of batteries, and particularly of the NiCd or lead acid types, it is very desirable to be able to know when the battery under charge has reached a full-charge state. Also, when battery charging is left unattended, it is important to provide some arrangement to prevent battery overcharged in order not to damage the battery. Some batteries tend to explode when being overcharged.

Other proposals have involved battery chargers for various electrical devices. The problem with these devices is that they do not provide an animated indication of the power level for the battery. Thus, an unaddressed need exists in the industry to address the aforementioned deficiencies and inadequacies. Even though the above cited methods for battery chargers meets some of the needs of the market, an animated battery charging assembly with a fan for cooling a charging port and the electrical device, and software to regulate the animation of an animated model is still desired.

SUMMARY OF THE INVENTION

The present invention is directed to an animated battery charging assembly. The animated charging assembly, hereafter "assembly", provides a charging dock that is configured for the dual purpose of charging a battery, and providing an indicator of the power level for the battery during the charge through the use of an animated model that articulates in correlation to the power level of the battery. The charging assembly further comprises a fan for cooling a charging port and the electrical device, and software to regulate the animation of an animated model.

In one embodiment, the charging dock charges a battery for an electrical device. Though a battery for any electrical component may be charged in other embodiments. The charging dock also supports an attached model that depicts a character, such as a fictional or real character, that is capable of animation, audio, and illumination. The model articulates in conjunction with the variable power level of the battery.

In some embodiments, the amount of energy remaining in the battery of the electrical device during charging is depicted as a power level. The model articulates limbs, garment, and accessories in correlation to the power level. Software communicates the pertinent power level to the model for appropriate articulation. In one embodiment, a fan cools the electrical device during charging, and enhances the animation effect of the model.

In operation, a circuit integrates into the charging dock 102. The circuit may include a resistor which is designed to sense the charging current. As long as the charging current through the resistor is greater than a known level, thereby indicating that the battery is not yet fully charged, the voltage across the resistor exceeds a chosen voltage. As a result, a transistor, connected in parallel with the power level indicator e.g. an illumination portion, is turned on to articulate. However, once the battery reaches full charge and, as a result the charging current drops below the known level, the transistor is cut off and the power level indicator may terminate, thereby indicating a full-charge state of the battery.

In one aspect, an animated charging assembly for indicating a power level of a battery during charging, comprises:
  a charging dock, the charging dock defined by a base, a model support portion, and a socket, the charging dock configured to provide a charge, the socket configured to enable operative connection for providing the charge, wherein the status of the charge comprises a power level;
  a model, the model disposed to position on the model support portion of the charging dock, the model defined by at least one limb, a garment, and at least one accessory, at least one of the at least one limb, the garment, and the at least one accessory configured to articulate in correlation to the power level of the battery, wherein the position and motion of the model is arranged to alter during the charge;

a speaker, the speaker configured to emit an audible signal that correlates to the power level;

an illumination portion, the illumination portion configured to emit a light that correlates to the power level;

a software, the software configured to control the articulation of the model, the emitting of audible signal, and the emitting of light base on the power level, wherein the software communicates with the model, the speaker, and the illumination portion; and a fan, the fan configured to blow air in proximity to the charging dock and the model.

In another aspect, the charging dock is configured to charge a battery for an electrical device.

In another aspect, the electrical device comprises a smart phone having a display screen, the display screen configured to display the power level.

In another aspect, the power level is the amount of charge on the battery of the electrical device.

In another aspect, the socket is a charging port.

In another aspect, charging dock includes at least one switch for operating the assembly.

In yet another aspect, the model is a three-dimensional character.

In yet another aspect, the model comprises a receiver for communicating with the software.

In yet another aspect, the at least one limb includes at least one member selected from the group consisting of: an arm, a leg, and a neck.

In yet another aspect, the garment includes at least one member selected from the group consisting of: a cape, a dress, a trouser, and a shirt.

In yet another aspect, the at least one accessory includes at least one member selected from the group consisting of: a weapon, a wand, a tool, and an instrument.

In yet another aspect, the fan is configured to pivot on the charging dock.

In yet another aspect, the software is a downloadable software application.

In yet another aspect, the software downloads on the electrical device.

In yet another aspect, the illumination portion is a series of LEDs.

In yet another aspect, the base of the charging dock comprises a motion control detector to trigger an event, such as light, sound, fan, or animation of the model.

One objective of the present invention is to provide a charging dock for an electrical device that also entertains while informing the power level of the battery in the charging dock.

Another objective is to provide a charging dock that charges a variety of electrical devices and electronic apparatuses, such as smart phones.

Another objective is to provide a model that is known to children.

Another objective is to provide a fan to cool the electrical device while charging, and to enhance animation of the model.

Another objective is to provide a speaker to enable the model to speak about the power level of the battery.

Another objective is to provide an illumination portion to enable the model and/or the charging dock to emit a light for indicating the power level of the battery.

One objective of the present invention is to provide a general purpose charger that recharges batteries in a timely manner.

Another objective is to indicate the status of the power level for the recharging battery.

Another objective is to animate the indicator of the power level.

Yet another objective is to entertain children while they wait for the battery to charge.

Another objective is to provide a decorative charging dock.

Another objective is to provide an inexpensive to manufacture animated charging assembly.

Yet another objective is to provide cost effective recharging for a battery.

Other systems, devices, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims and drawings.

BRIEF DESCRIPTION OF THE DRAWINGS

The invention will now be described, by way of example, with reference to the accompanying drawings, in which.

Like reference numerals refer to like parts throughout the various views of the drawings.

DETAILED DESCRIPTION OF THE INVENTION

Figure 1:
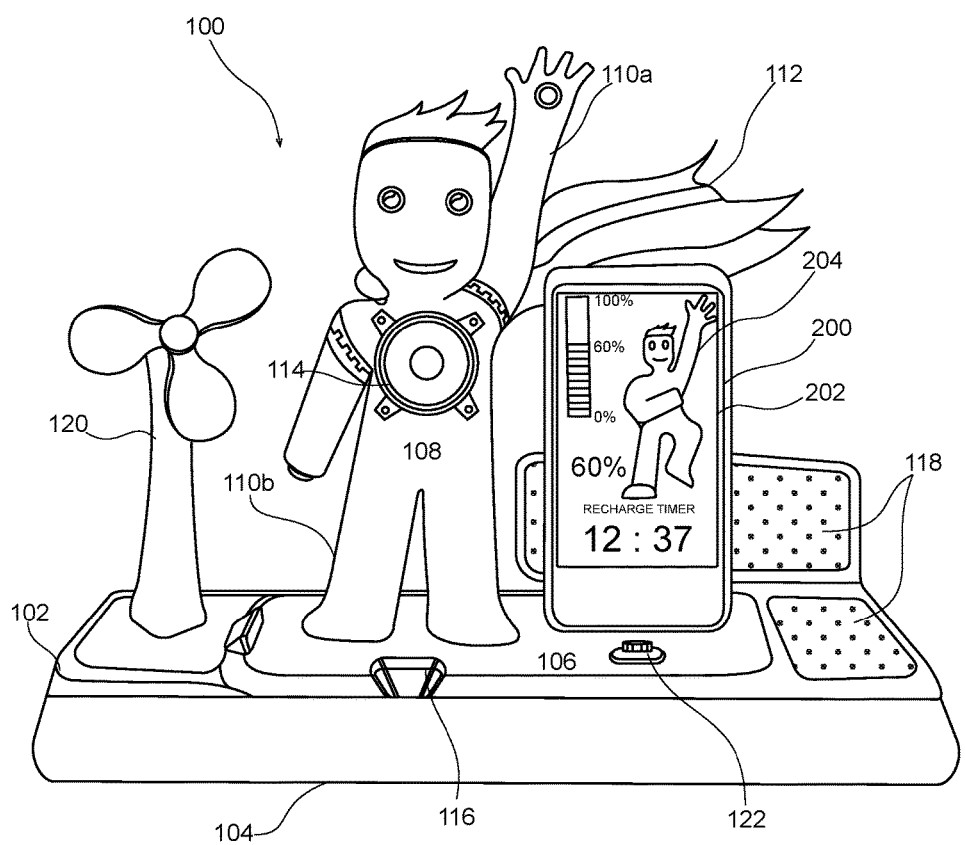
FIG. 1 illustrates a perspective view of an exemplary animated charging assembly with an exemplary model, an illumination portion, a speaker, and a fan, in accordance with an embodiment of the present invention.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "first," "second," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

At the outset, it should be clearly understood that like reference numerals are intended to identify the same structural elements, portions, or surfaces consistently throughout the several drawing figures, as may be further described or explained by the entire written specification of which this detailed description is an integral part. The drawings are intended to be read together with the specification and are to be construed as a portion of the entire "written description" of this invention as required by 35 U.S.C. § 112.

Figure 2:
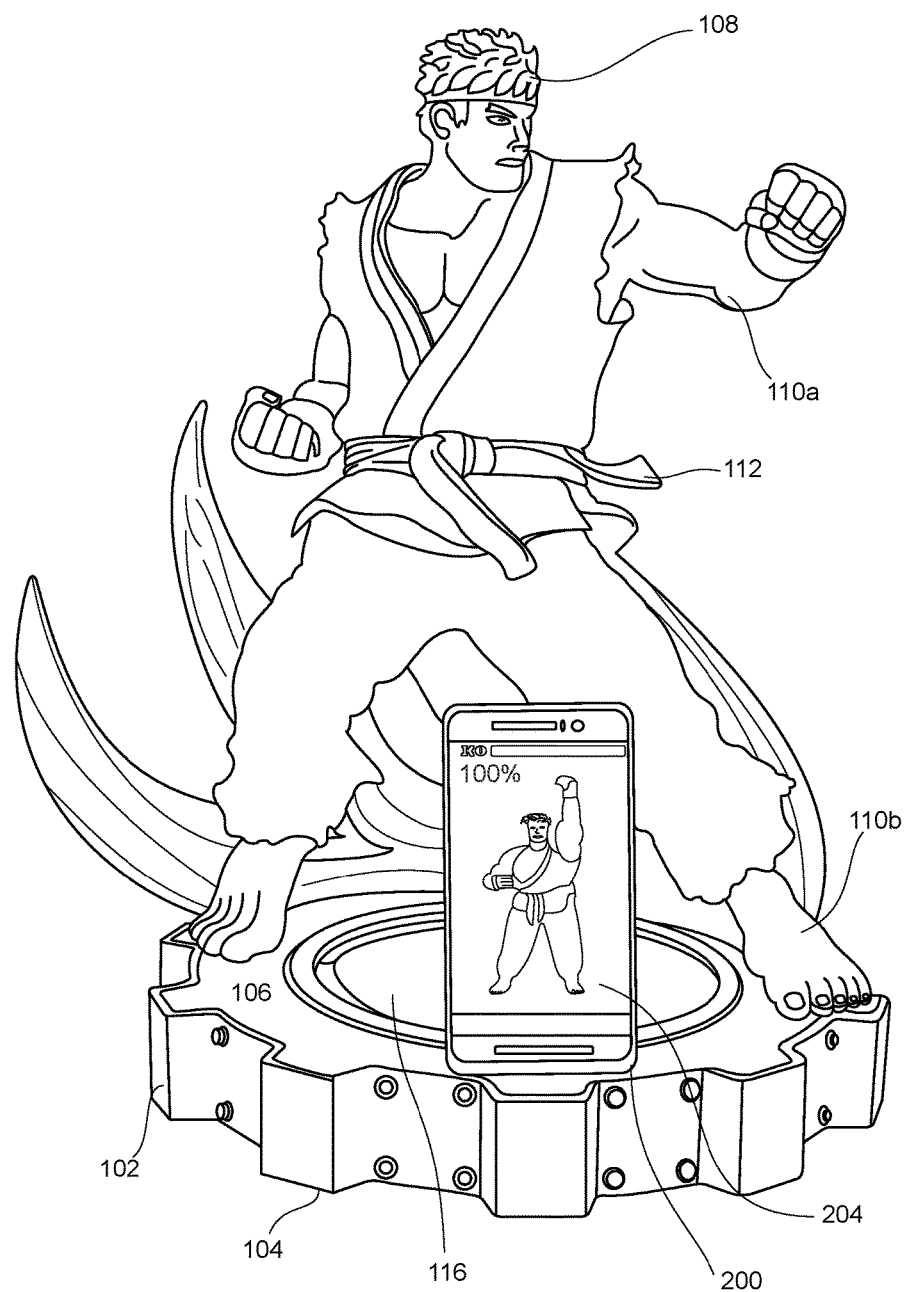
FIG. 2 illustrates a perspective view of the model articulating while the illumination portion emits a light on the model, in accordance with an embodiment of the present invention.
Figure 3:
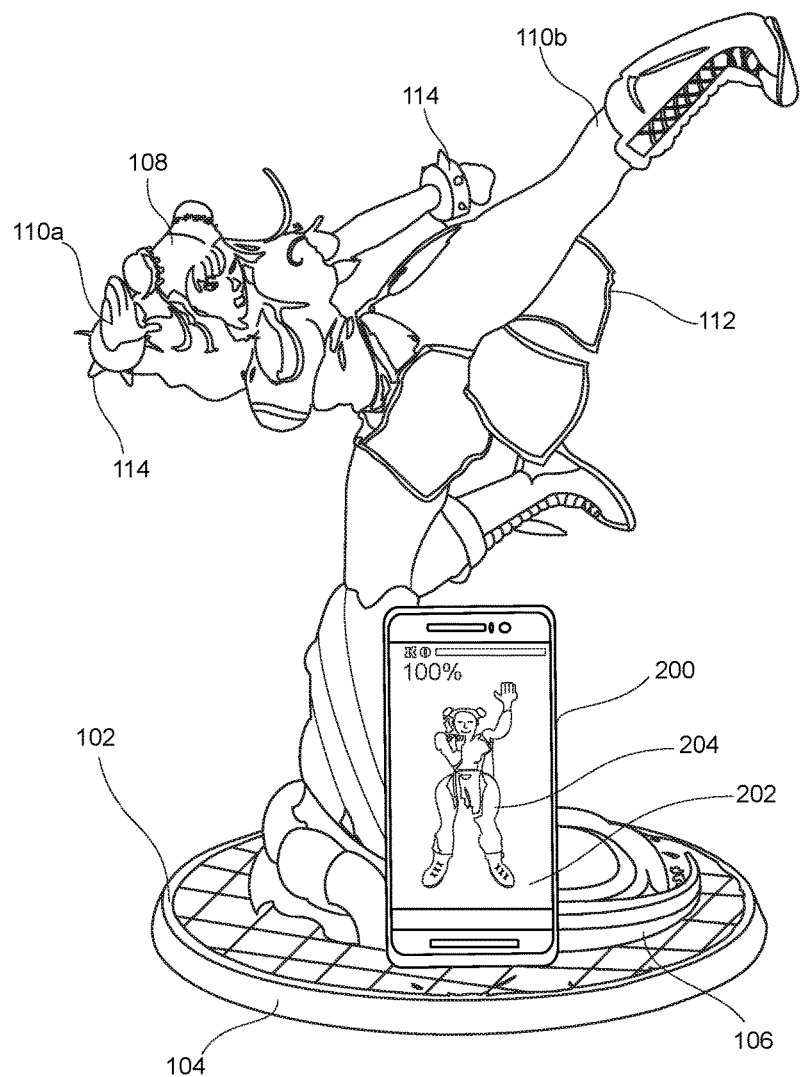
FIG. 3 illustrates a perspective view of the model articulating in a kicking pose, in accordance with an embodiment of the present invention.

In one embodiment of the present invention presented in FIGS. 1-3, an animated battery charging assembly 100 recharges a battery while simultaneously indicating a power level of the recharging battery in an entertaining, interactive manner. The animated battery charging assembly 100, hereafter, "assembly 100", provides a charging dock 102 for the dual purpose of charging a battery for an electrical device 200, and providing an entertaining indicator of the power level for the battery through a model 108 that articulates in correlation to the power level of the battery during the duration of the charge.

In some embodiments, the charging dock 102 may charge a battery for an electrical device 200, such as a communication device or smart phone. Though in other embodiments, any battery for any use may be charged. The charging dock 102 detachably couples to a model 108 that depicts a character, such as a fictional or real character capable of animation, audio, and illumination. The charging dock 102 also includes a fan 120 to cool the electrical device 200 during charging, and to enhance the animation effect of the model 108.

The electrical device 200 detachably couples to a port in the charging dock 102 to enable recharging of the battery. The amount of energy remaining in the battery of the electrical device 200 is depicted as a power level. The power level increases during the duration of the charge, until the battery for the electrical device 200 is fully charged and ready for operation. The model 108 articulates at least one limb 110a, 110b, a garment 112, and at least one accessory 114 in correlation to the power level.

Software in the electrical device 200 communicates the power level to the model 108 for enabling appropriate articulation of the limb 110a, 110b, garment 112, and accessory 114. The software also displays an image 204 of the model 108 on the display screen 202 of the electrical device 200 to indicate the status of the power level. Thus, the assembly 100 not only charges the battery for the electrical device 200, but also provides visual and audible indication of the power level for the battery; and thereby provides an entertaining visual indication for when the battery is fully charged and ready for operation in the electrical device 200.

As referenced in FIG. 1, the assembly 100 includes a charging dock 102 that forms the foundation of support and includes the components for charging the battery of the electrical device 200. The charging dock 102 is defined by a base 104 for supporting the assembly 100, a model support portion 106 for supporting a model 108, and a socket for enabling operative connectivity to charge the electrical device 200.

The socket is configured to couple directly with the electrical device 200 or receive a cable leading to the electrical device 200. In this manner, the battery in the electrical device 200 is charged to a desired power level. In some embodiments, the socket may include a series of variously sized and dimensioned sockets for adapting to any number of electrical devices. The electrical device 200 may include, without limitation, a smart phone, a tablet, a laptop, and a rechargeable battery for an electrical apparatus. In some embodiments, the charging dock 102 may provide charging speeds of 500 mA, 1 A, or 2.1 A depending on what electrical device is being charged.

In one embodiment, the charging dock 102 may have an independent power source, such as a battery, an external cord to an alternating current socket, and a solar panel. The charging dock 102 may include a speaker 118 that emits audible sounds in correlation to the power level. The sounds may include a voice that depicts the model 108, music, a radio, therapeutic nature sounds, and a prerecorded voice. The charging dock 102 may further include an illumination portion that emits light in correlation to the power level.

In operation, a circuit integrates into the charging dock 102. The circuit may include a resistor which is designed to sense the charging current. As long as the charging current through the resistor is greater than a known level, thereby indicating that the battery is not yet fully charged, the voltage across the resistor exceeds a chosen voltage. As a result, a transistor, connected in parallel with the power level indicator e.g. an illumination portion, is turned on to articulate. However, once the battery reaches full charge and, as a result the charging current drops below the known level, the transistor is cut off and the power level indicator may terminate, thereby indicating a full-charge state of the battery.

In one exemplary use of the charging dock 102, an AC/DC adapter and a cable extend from one end of the AC/DC adapter for connecting the AC/DC adapter to a smart phone. The AC/DC adapter may comprise a set of metal blades for insertion into an electric outlet (not shown) to receive AC power supply, and a LED, which animates the model when electric current passing through the AC/DC adapter. In another embodiment, the AC/DC adapter converts AC power supply into DC power supply for charging the battery of the smart phone connected to the cable. Though in other embodiments, wireless charging of the battery may be employed.

In another embodiment of the present invention, the assembly 100 includes software that enables communication between the charging dock 102, the electrical device 200, and the model 108. The software may include a downloadable application. The software enables the display screen 202 of the electrical device 200 to visually display and notify to the status of the battery on the electrical device 200 while charging. The software may also enable the display screen 202 to display the power level of the battery through a moving image 204 that depicts the model 108 or other pertinent image.

For example, without limitation, the electrical device 200 is loaded with the software application. The display screen 202 displays an image 204 of the model 108 next to a gradual power level bar. As the charging commences, the power level bar increases or changes shape and/or color to indicate the increasing power level for the battery of the electrical device 200. Further, the display screen 202 displays the image 204 of the model 108 on the moving, changing shape, or changing colors, so as to indicate the increasing power level for the battery of the electrical device 200.

Turning now to FIG. 2, the display screen 202 displays the model 108 moving in correlation with the increase in power level. The image 204 of the model 108 on the display screen 202 of the electrical device 200 may show the limb 110a, 110*bs* of the model 108 moving in correlation with the increase in power level for the electrical device 200. For example, the arms are lowered at the initial charging, and incrementally raise in correlation to the power level. When the electrical device 200 is fully charged, the arms are fully raised. In yet another embodiment, the display screen 202 may display any image 204 and emit any sound that can be associated with a battery charge.

Further, the software application may be loaded onto the electrical device 200 to display the power level of the battery directly through the model 108, through articulation of the at least one limb 110*a*, 110*b*, a garment 112, and at least one accessory 114 of the model 108. For example, the software controls articulation of the arms, a cape, and a sword on a martial arts character.

Thus, the software communicates the power level of the battery on the display screen 202 of the electrical device 200 by displaying a moving image 204 that correlates to the power level of the battery. The software also communicates the power level of the battery to the model 108, by controlling the appropriate articulation of the model 108 that correlates to the power level of the battery.

As FIG. 3 illustrates, the model 108 may include a three-dimensional depiction of a character, such as a superhero, cartoon character, or celebrity. FIG. 2 illustrates a male fighting warrior being illuminated while standing. FIG. 3 illustrates a female fighter in a kicking pose. However, the model 108 may also include any depiction of a person, robot, animal, or plant. Suitable materials for the model 108 may include, without limitation, polyurethane, polyvinyl chloride, rigid polymers, aluminum, die cast steel, metal alloys, fiberglass, and wood.

The model 108 is configured to operatively connect to the model support portion 106 of the charging dock 102. In one embodiment, the model 108 rests, stands, and jumps on the model support portion 106 of the charging dock 102. The model 108 is configured to articulate, illuminate, and emit audio signals in correlation to the power level of the battery of the electrical device 200 during the duration of the charging process. In one possible embodiment, the model 108 includes a receiver for communicating with the software on the electrical device 200.

As depicted in FIG. 2, the model 108 includes at least one limb 110*a*, 110*b*, such as an arm, a leg, and a neck. The model 108 may also include garment 112, such as a cape or dress. The model 108 may also include at least one accessory 114, such as a weapon, a wand, and a tool. The limb 110*a*, 110*b*, garment 112, and accessory 114 are configured to articulate in correlation to the power level. The articulation may be simultaneous to the image 204 on the display screen 202 of the charging dock 102. For example, a rotating head on the image 204 of the model 108 on the display screen 202 correlates to a rotating head of the actual model 108. However, the model 108 may also operate independently of the image 204 on the display screen 202 of the electrical device 200.

The model 108 includes a receiver for communicating with the charging dock 102 and/or the electrical device 200 through the software. In this manner, the model 108 is adapted to coordinate with the power level of the battery for the electrical device 200. The model 108 may utilize a gear system and motorized joints to articulate the limb 110*a*, 110*bs*, garment 112, and accessory 114 in correlation with the power level. Thus, once the software communicates the power level to the model 108, the gear system and motorized joints move the limb 110*a*, 110*b*, garment 112, and accessory 114 to the appropriate position. However, in other embodiments, additional components, such as tension from a spring or band, magnets, gravity, and liquid weights may be used to actuate articulation of the limb 110*a*, 110*b*, garment 112, and accessory 114.

In one exemplary articulation by the model 108, the model 108 may be disposed in a "tired", or slumped over position when the power level of the battery is low. As the battery charges up, the model 108 articulates into a standing, "awake" position to correlate to an increasing power level of the battery. In another example, the clothing and accessories can articulate independently or simultaneously with the limb 110*a*, 110*bs* of the model 108. For example, a cape can move while the arms, legs, and head remains stationary during the duration of the charge. The model 108 may also emit audible signals and lights in conjunction with the articulation of the limb 110*a*, 110*b*, garment 112, and accessory 114. In any case, the articulated animation of the model 108 works to visually indicate the correlating power level of the battery in the electrical device 200.

In addition to articulation of limb 110*a*, 110*bs* that correlates with the power level, the model 108 may emit an audible signal through a speaker 118 that is positioned in the charging dock 102 and/or in the model 108 itself. For example, the speaker 118 may emit a signal as follows: "The phone is half-way charged", while the arm of the model 108 raises a sword to the torso region. After a duration of charging, the speaker may emit a signal as follows: "The phone is fully charged", while the arm of the model 108 raises the sword completely above the head of the model 108. In one possible embodiment, the electrical device 200 controls the speaker 118 through the software. A power source, either in the charging dock 102, or in the model 108, such as a battery or external alternating current socket may be used to power the model 108 and the speaker 118.

In addition to the articulation of limb 110*a*, 110*bs* and audible signal from the speaker 118 that correlate with the power level, the model 108 and/or the charging dock 102 may emit a light through an illumination portion 116. The emitted light correlates to the power level of the battery in the electrical device 200. The illumination portion 116 may be disposed in the charging dock 102 and/or the model 108. The illumination portion 116 may include, without limitation, a halogen bulb, a series of LEDs, and a flashing light bulb having any possible combination of colors and patterns. For example, as the power level of the battery increases, the intensity or color of the light emitting from the eyes of the model 108 increase. In one alternative embodiment, the base 104 of the charging dock 102 comprises a motion control detector to trigger an event, such as light, sound, fan, or animation of the model 108. For example, the motion control detector actuates a night light.

As shown in FIG. 1, the charging dock 102 further includes a fan 120. The fan 120 is disposed proximally to the model 108 and the socket that charges the electrical device 200. The fan 120 is configured to blows air directly onto the electrical device 200 for cooling the components of the electrical device that may heat up during the charging process. The fan 120 also blows air directly on the model 108 to enhance animation of the model 108 by creating a blowing effect on the garment 112 or accessory 114 of the model 108. For example, the air blows through a cape and/or hair of the model 108. Consequently, the cape and/or hair flutter to give the illusion that the model 108 is flying. In one alternative embodiment, the fan 120 is rotatable on a stand that protrudes up from the charging dock 102.

Since many modifications, variations, and changes in detail can be made to the described preferred embodiments

What I claim is:

1. An animated charging assembly for indicating a power level of a battery during charging, the assembly comprising:
a charging dock, the charging dock defined by a base, a model support portion, and a socket, the charging dock configured to provide a charge to a battery and display a status of the charge, the socket configured to enable an operative connection for providing the charge, wherein the status of the charge comprises a power level of the battery;
a model, the model disposed to a position on the model support portion of the charging dock, the model defined by at least one limb, a garment, and at least one accessory, at least one of the at least one limb, the garment, and the at least one accessory configured to articulate in correlation to the power level of the battery, wherein the position and a motion of the model is arranged to alter during the charging;
a speaker, the speaker configured to emit an audible signal that correlates to the power level;
an illumination portion, the illumination portion configured to emit a light that correlates to the power level;
a software, the software configured to control the articulation of the model, the emitting of an audible signal, and the emitting of a light based on the power level, wherein the software communicates with the model, the speaker, and the illumination portion; and
a fan, the fan configured to blow air in proximity to the charging dock and the model.

2. The assembly of claim 1, wherein the charging dock is configured to charge a battery for an electrical device.

3. The assembly of claim 2, wherein the electrical device comprises a smart phone having a display screen, the display screen configured to display the power level.

4. The assembly of claim 3, wherein the power level is an amount of charge on the battery of the electrical device.

5. The assembly of claim 4, wherein the software is a downloadable software application.

6. The assembly of claim 5, wherein the software downloads on the electrical device.

7. The assembly of claim 1, wherein the socket is a charging port.

8. The assembly of claim 1, wherein the charging dock includes at least one switch for operating the assembly.

9. The assembly of claim 1, wherein the model is a three-dimensional character.

10. The assembly of claim 1, wherein the model comprises a receiver for communicating with the software.

11. The assembly of claim 1, wherein the at least one limb includes at least one member selected from a group consisting of: an arm, a leg, and a neck.

12. The assembly of claim 1, wherein the garment includes at least one member selected from a group consisting of: a cape, a dress, a trouser, and a shirt.

13. The assembly of claim 1, wherein the at least one accessory includes at least one member selected from a group consisting of: a weapon, a wand, a tool, and an instrument.

14. The assembly of claim 1, wherein the fan is configured to pivot on the charging dock.

15. The assembly of claim 1, wherein the illumination portion is a series of light-emitting diodes (LEDs).

16. The assembly of claim 1, further including a motion control detector, the motion control detector configured to trigger at least one of the following: the light, the audible signal, the fan, or animation of the model.

17. The assembly of claim 1, further including a circuit, the circuit operatively connected to the charging dock, the circuit comprising a resistor configured to sense a charging current for indicating the power level.

18. An animated charging assembly for indicating a power level of a battery during charging, the assembly comprising:
a charging dock, the charging dock defined by a base, a model support portion, and a socket, the charging dock configured to provide a charge to a battery and display a status of the charge, the socket configured to enable an operative connection for providing the charge, wherein the status of the charge comprises a power level of the battery;
a model, the model disposed to a position on the model support a portion of the charging dock, the model defined by at least one limb, a garment, and at least one accessory, at least one of the at least one limb, the garment, and the at least one accessory configured to articulate in correlation to the power level of the battery, wherein the position and a motion of the model is arranged to alter during the charging;
a speaker, the speaker configured to emit an audible signal that correlates to the power level;
an illumination portion, the illumination portion configured to emit a light that correlates to the power level;
a software, the software configured to control the articulation of the model, the emitting of an audible signal, and the emitting of a light based on the power level, wherein the software communicates with the model, the speaker, and the illumination portion;
a fan, the fan configured to blow air in proximity to the charging dock and the model;
a motion control detector, the motion control detector configured to trigger at least one of the following: the light, the audible signal, the fan, or animation of the model; and
a circuit, the circuit operatively connected to the charging dock, the circuit comprising a resistor configured to sense a charging current for indicating the power level.

19. The assembly of claim 18, wherein the power level is an amount of charge on a battery of an electrical device.

20. The assembly of claim 18, wherein the model is a three-dimensional character.

* * * * *